United States Patent [19]

Swoboda

[11] 3,781,479

[45] Dec. 25, 1973

[54] METHOD AND APPARATUS FOR TRANSMITTING TIME COMPRESSED AUDIO INFORMATION

[75] Inventor: Maxmillian Augustus Swoboda, College Park, Md.

[73] Assignees: Jack L. Lahr, Washington, D.C.; Jack M. Benson, Silver Spring, Md.

[22] Filed: Jan. 26, 1970

[21] Appl. No.: 5,659

[52] U.S. Cl. ....... 179/15.55 T, 178/6.8, 178/DIG. 3

[51] Int. Cl. ........................................ H04m 1/00

[58] Field of Search ..................... 178/6.8, DIG. 3, 178/6.6 DD, 6.7 R; 179/2 TV, 15.55 T, 15.55 R, 1 VS, 1 SA, 2 DP, 100.3 V, 100.1 S; 340/146.3 F, 146.3 E

[56] References Cited

UNITED STATES PATENTS

| | | | |
|---|---|---|---|
| 2,384,131 | 9/1945 | Price | 179/100.3 V |
| 2,281,405 | 4/1942 | Barrish | 179/100.1 S |
| 2,273,866 | 2/1942 | Holst | 179/100.3 V |
| 3,027,425 | 3/1962 | Tannenbaum | 179/15.55 T |
| 3,467,772 | 9/1969 | Crane | 179/2 TV |
| 3,495,042 | 2/1970 | Johnston | 179/15.55 |
| 3,564,127 | 2/1971 | Sziklai | 178/6.6 DD |
| 3,381,086 | 4/1968 | DeMoss | 178/7 R |
| 3,138,669 | 6/1964 | Rabinow | 179/100.1 |

*Primary Examiner*—Kathleen H. Claffy
*Assistant Examiner*—Jon Bradford Leaheey
*Attorney*—Cushman, Darby and Cushman

[57] ABSTRACT

This specification discloses a method of storing, transmitting and selectively retrieving a large quantity of information such as audio signals over a wide bandwidth communication system such as television. An entire block of such information is recorded at a real-time rate, rapidly transmitted in its entirety at a greatly accelerated rate by a relatively wide bandwith signal, received and re-recorded at substantially the same accelerated rate for subsequent reproduction of the audio information at a real-time rate. Several specific methods and apparatus are disclosed for carrying out these concepts.

10 Claims, 3 Drawing Figures

Figure 1:
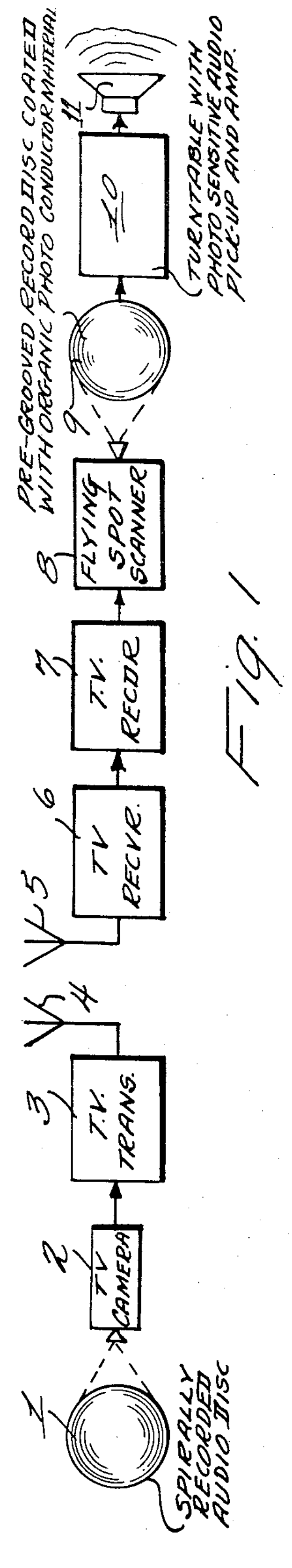

INVENTOR
MAXIMILLIAN A. SWOBODA

BY
Cushman, Darby & Cushman
ATTORNEYS

METHOD AND APPARATUS FOR TRANSMITTING TIME COMPRESSED AUDIO INFORMATION

This invention relates to systems for transmitting large blocks of audio or other relatively low frequency information in only very short periods of time. Briefly stated, the underlying principle of this invention is the storage or accumulation of a large quantity of narrow bandwidth information signals followed by rapid transmission over a wide bandwidth communication system with the information again stored at the receiving end of the system for subsequent reproduction of narrow bandwidth signals in substantially the original form.

There are many applications for an apparatus employing these principles. For instance it is often necessary to supply a plurality of different radio transmitting sites with up to 24 hours of program material each day. Standard real-time transmitting techniques are subject to periodic fading, static and other interferences and can transmit only one program per communication channel which is then continuously occupied in the transmission of such information. This invention makes it possible to transmit a complete 24 hour segment of audio program material to any selected point in no more than 2.5 minutes which includes enough time for many redundant transmissions to compensate for any fading, static, or other transmission interferences. Using this invention with only one 4–6 mhz television communication channel and existing satellite relay stations, separate and complete 24 hour program packages, each in a different language if desired, can be transmitted worldwide to each of many multi-country transmitting stations in the relatively short time span of no more than 2.5 minutes for each unique 24 hour program package.

Other applications of this invention include time-compressed transmission of long-term information such as seismic signals, analog information, complex amplitude signals or any other use where it would be advantageous to rapidly and/or redundantly transmit a large quantity of relatively narrow bandwidth information.

Accordingly, it is an object of this invention to devise a method for rapidly transmitting information which has been either mechanically, magnetically, electronically, electrostatically or optically recorded in a spiral pattern such as on a standard mechanically recorded audio record and then reproducing this information at a real-time rate at a distant receiving station.

Another object of this invention is to devise a method and apparatus for storing information by a scanning process at a real-time rate in a raster format and then rapidly transmitting this stored information raster and recapturing it in the same raster form at a remote receiving station where the original information may be reproduced by re-scanning the received raster at a real-time rate.

Figure 2:
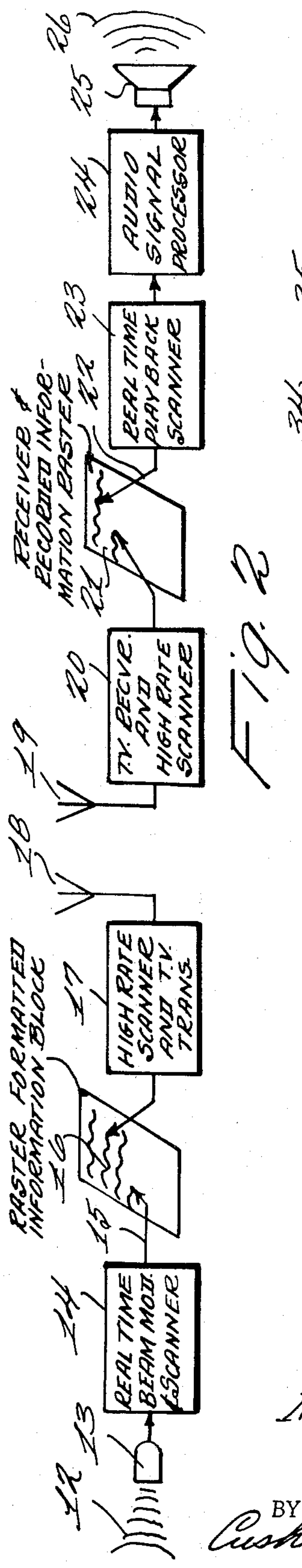
Figure 3:
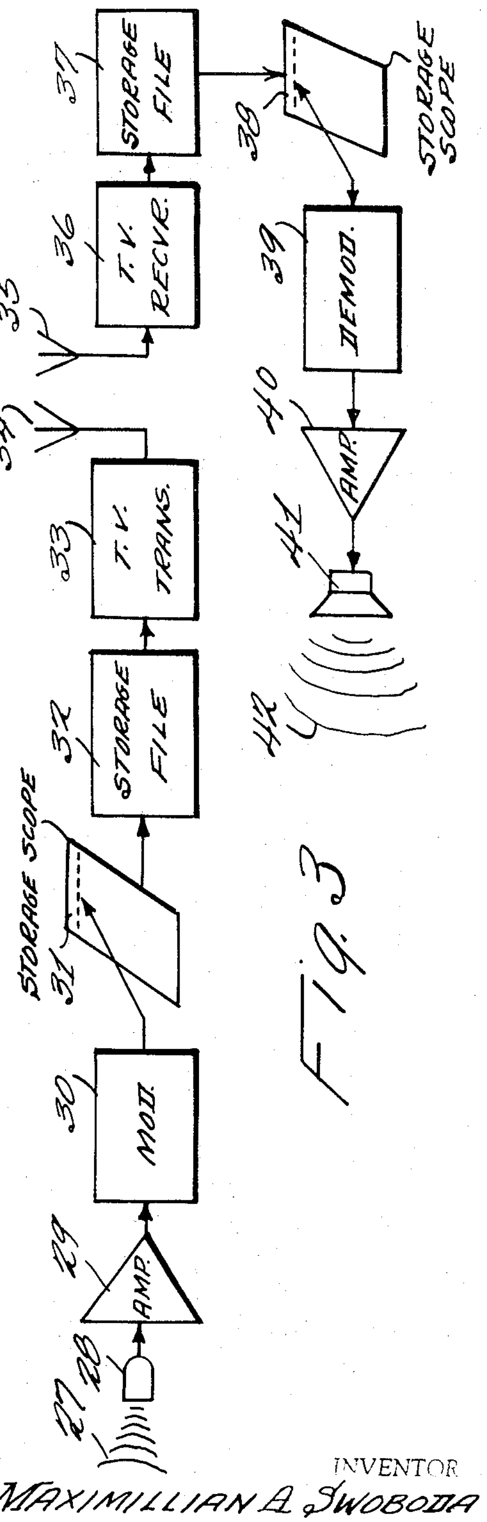

A more detailed understanding of this invention may be obtained by reference to the following detailed explanation and the drawings of which:

FIG. 1 is a block diagram of a system for rapidly transmitting information mechanically or optically recorded in a spiral pattern on an audio disc or record, FIG. 2 diagrammatically depicts a second raster scanning system for practicing this invention, and FIG. 3 is a block diagram of a particular apparatus for practicing the system shown in FIG. 2.

Referring to FIG. 1, a system is shown for rapidly transmitting and then reproducing at a real-time rate all the information on a spirally recorded audio record. Here a standard mechanically recorded audio record 1 (such as a 33⅓ rpm long playing record) or other spirally recorded sound track (such as an optical sound track) is photographed by television camera 2 having a resolution power at least greater than the density of spirally recorded grooves or tracks. For instance, a television camera resolution of 600 lines per inch may be used for records having 380 lines per inch. Preferably, for obvious reasons, the television camera should have as high a resolution power as is possible.

The resulting sound-image of the spirally recorded information is then transmitted by a standard television transmitter 3 as electrical signals from transmitting antenna 4 to receiving antenna 5. Thus, if standard equipment is used, an entire 30 minute block of audio information recorded on record 1 may be transmitted from antenna 4 to antenna 5 in the time necessary to transmit only one frame of a television picture or 1/30 of a second resulting in a time compression ratio of approximately 54,000 to 1. Of course, it may be desirable to redundantly transmit the same information during a subsequent television frame to compensate for possible distortions or interferences with the first transmission. Thus, by combining such a multiplicity of transmitted frames, a very faithful reproduction of the original image of the record may be reconstructed by the television receiver 6. Such received information may be recorded on a television recorder 7 or it may be allowed to pass directly to a flying spot scanner 8 which reproduces a pattern of light corresponding to the image of the original spirally recorded audio information. This reproduced pattern of light is then properly positioned with respect to a pregrooved disc 9 and allowed to react with a layer of organic photoconductor material present on the surface of the disc. The result is permanently recorded optical variations in a spiral pattern on disc 9 corresponding to the light pattern which in turn corresponds to the original information contained on audio record 1. This original audio information may then be extracted in a known manner at a real-time rate by revolving disc 9 at an appropriate rate (33⅓ rpm for example) and then sensing the audio information with a photosensitive pickup which is spirally tracked with the spiral pattern of audio information by the precut grooves in disc 9.

In FIG. 2 a second embodiment of this invention is shown. Here an audio signal source (e.g. soundwaves 12 and transducer 13) are used to modulate a beam of energy 15 as that beam is being swept or scanned along lines in a predetermined raster format across a storage medium 16. The beam of energy 15 may be coherent or non-coherent light, ultrasonic pressure waves, a beam of energized particles such as electrons or any other beam with an energy content that may be modulated. The storage medium 16 must, of course, be chosen in conjunction with the type of energy being utilized and typically may be light or heat sensitive films, a storage cathode ray tube, mechanically deformable films, magneto-optics, photometric materials, etc.

After a block of information is stored as previously described, the entire block may be very rapidly scanned and transmitted as broadband electrical signals via known television apparatus 17 from antenna 18 to antenna 19 where it is received by television receiver 20. The received information is re-recorded at a very high rate in the same original raster format upon another storage medium 21 which may or may not be of the same type as storage medium 16. For instance, medium 21 may involve known electrostatic or organic photo-conductive recording processes. Subsequently, the audio information may be recaptured at a real-time rate by performing the inverse of the previously discussed recording process. That is, the storage medium 21 is scanned in the proper predetermined raster format by scanner 23 at a real-time rate with an unmodulated energy beam 22 which produces reflections, backscatter or transmitted energy which is modulated in accordance with the stored information. This modulated energy is then detected, processed and amplified by device 24 to complete the reproduction process.

With this system it is possible to record a whole hour of real-time audio information in one raster using a single line tracing time of slightly more than 8 seconds with approximately 440 lines in each raster. Twenty-four hours of substantially perfect audio information may then be transmitted from one point to another if 24 such hour long rasters are continuously and sequentially transmitted for no more than a 2.5 minute period. Using standard television specifications this would allow redundant transmission of each hour-long raster over 180 times to compensate for possible transmission distortions.

In FIG. 3 a specific apparatus is shown for practicing the system of FIG. 2. Here audio signals are processed by modulator 30 and impressed upon the face of a storage cathode ray tube by a real-time scanning process. When a resulting original "audio raster" is completed, it is passed to a temporary or buffer storage file 31 of a known type that is capable of storing up to 300 such audio rasters. Then, at a desired time, a selected audio raster or rasters may be transmitted by known television apparatus 33, 34, 35 and 36 and stored in a similar storage file 38 at the receiving site. At any desired time, any selected prestored audio raster may be extracted from file 37 and transferred to the face of a storage cathode ray tube 38 where it is maintained while a slow real-time rate scan is performed and the original real-time audio information is detected, processed and reproduced by demodulator 39, amplifier 40 and loud speaker 41. This method is particularly advantageous for efficient information transmission due to the storage and retrieval features resulting from the use of storage files at both the transmitting and receiving stations.

It will be apparent to those skilled in the art that there may be interposed between transmitters and receivers (3, 4 and 5, 6 in FIG. 1; 17, 18 and 19, 20 in FIG. 2; 33, 34 and 35, 36 in FIG. 3) intermediate transmission media such as is conventionally embodied in communications satellites, CATV, laser paths and the like.

While only a few embodiments of this invention have been described in this specification, it is readily apparent that one skilled in the art could make many modifications to the disclosed embodiments without departing from the scope of this invention.

What is claimed is:

1. A method for transmitting time compressed audio information, said method comprising the steps of:

composing an original sound-image recording of stored information by scanning a first storage medium in a raster format at a real-time rate with a beam having an energy content modulated by said audio information, said sound-image comprising a spatial distribution of detectable physical characteristics representing said audio information, transmitting via television electrical signals a completed original sound-image recording by scanning said raster format at a second rate substantially faster than said real-time rate, receiving said television electrical signals at a remote site, converting said television electrical signals after said receiving step into a reproduction of said original sound-image recording on a second storage medium by scanning in a second raster format at said second rate, and re-scanning said reproduced sound-image recording in said second raster format with a beam having an energy content at said real-time rate to extract the previously converted and stored information by detecting audio modulation produced during said re-scanning.

2. Apparatus for time compressed transmission of a block of audio information, said apparatus comprising:

recording means for composing an original sound-image recording of said audio information by scanning a storage medium in a raster format at a real-time rate with a beam having an energy content modulated by said audio information, said sound-image comprising a spatial distribution of detectable physical characteristics representing said audio information, and television transmitting means for transmitting said original sound-image recording of said information via television electrical signals at a rate substantially faster than said real-time rate by scanning said raster format.

3. Apparatus for retrieving at a real-time rate time-compressed audio information originally recorded in a raster format by scanning at a real-time rate and subsequently transmitted via television electrical signals, said apparatus comprising:

television receiving means for receiving said television electrical signals, television conversion means for converting said television electrical signals into a reproduction of said raster format on a storage medium by scanning at a rate substantially faster than said real-time rate, and scanning means for re-scanning said storage medium according to said raster format with a beam having an energy content at said real-time rate, thereby permitting detection of said audio information at said real-time rate.

4. A system for time compressed transmission and retrieval of a block of audio information recorded at a real-time rate, said system comprising:

a first cathode ray storage tube means for storing said block of audio information by scanning an electron beam in a raster format at said real-time rate, modulating means for passing said audio information to said storage tube at said real-time rate during the scanning of the electron beam, television transmitting means for transmitting said block of audio information from said storage tube means as television electrical signals at a second rate substantially greater than said real-time rate, television receiving means for receiving said electrical signals containing said block of audio information at said second rate, a second cathode ray storage tube means utilized after reception for storing said block of stored audio information at said second rate, means for scanning said second storage tube means with a second electron beam in said raster format at said real-time rate, and demodulating means for recovering said audio information from said second electron beam at said real-time rate.

5. A system as in claim 4 including means for storing a plurality of said blocks of stored audio information before transmitting and/or after receiving said blocks of stored audio information for subsequent selective retrieval and transmitting or reproduction respectively.

6. A method for transmitting and retrieving time-compressed audio information, said method comprising:

converting original audio information to a sound-image at a real-time rate, said sound-image comprising a spatial distribution of detectable physical characteristics representing said audio information, transmitting said sound-image via television transmitting apparatus, receiving said sound-image via television receiving apparatus, and converting said received sound-image to audio information at said real-time rate.

7. A method as in claim 6 wherein said sound-image is an optical image.

8. A system for transmitting and retrieving time-compressed audio information, said system comprising:

means for converting audio information to a sound-image at a real-time rate, said sound-image comprising a spatial distribution of detectable physical characteristics representing said audio information, means for transmitting said sound-image as television signals, means for receiving said television signals, means for converting said received television signals to a received sound-image, and means for converting said received sound-image to audio information at said real-time rate.

9. A system as in claim 8 wherein said sound-image is an optical image.

10. A new use for television communication equipment wherein audio information is time compressed and transmitted via television signals, said new use comprising the steps of:

composing an original sound-image recording of stored information by scanning a first storage medium in a raster format at a real-time rate with a beam having an energy content modulated by said audio information, said sound-image comprising a spatial distribution of detectable physical characteristics representing said audio information, transmitting via television electrical signals a completed original sound-image recording by scanning said raster format at a second rate substantially faster than said real-time rate, receiving said television electrical signals at a remote site, converting said television electrical signals after said receiving step into a reproduction of said original sound-image recording on a second storage medium by scanning in a second raster format at said second rate, and scanning said reproduced sound-image recording in said second raster format with a beam having an energy content at said real-time rate to extract the previously converted and stored information by detecting audio modulation produced during scanning.

* * * * *